Oct. 25, 1966   S. L. LAWRENCE ET AL   3,280,543
HAY WAFERING APPARATUS

Filed Dec. 19, 1963   4 Sheets-Sheet 1

INVENTORS
Stanley L. Lawrence, &
BY Robert E. Cooper
Barnard, McGlynn & Reising
ATTORNEYS

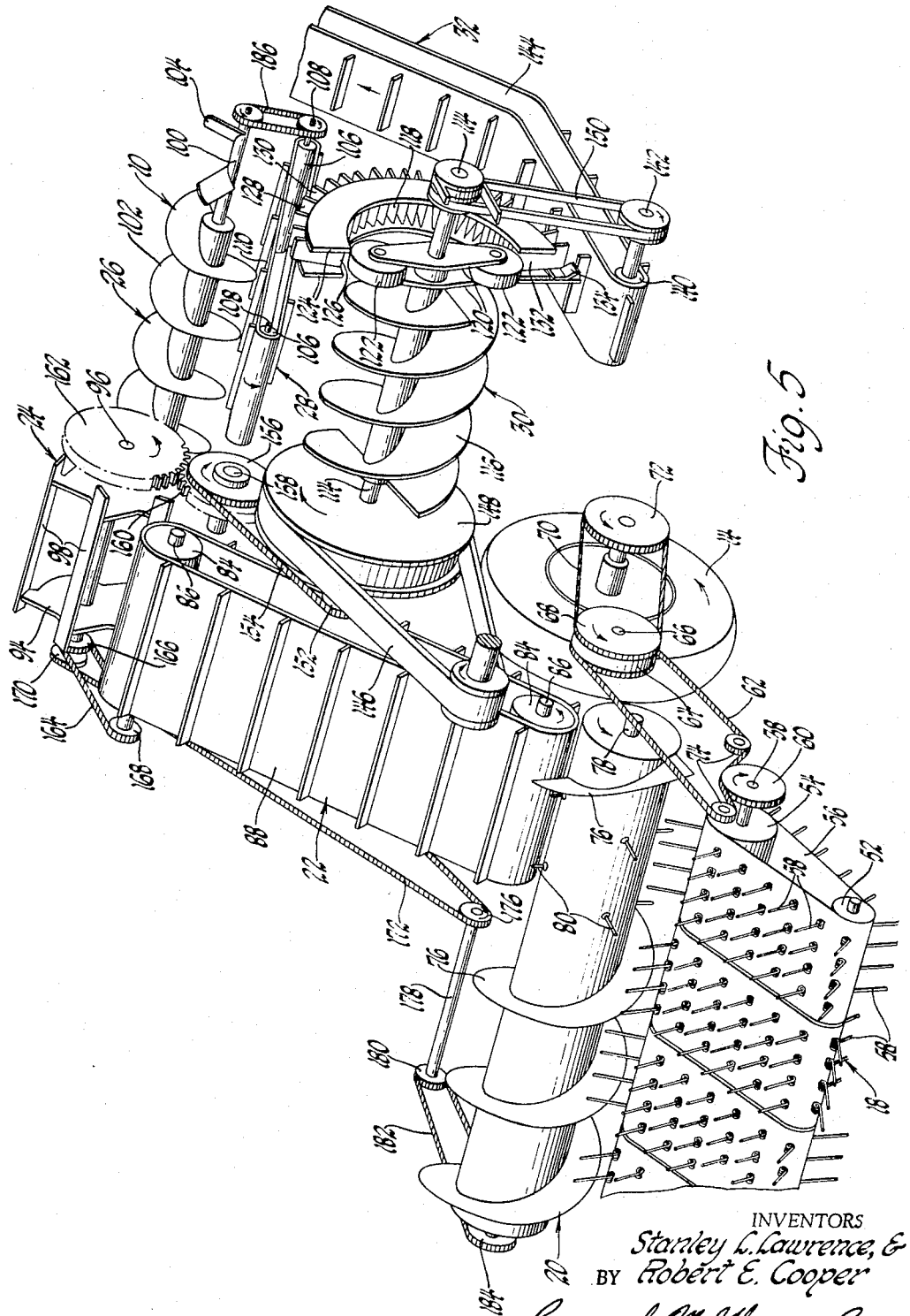

United States Patent Office 3,280,543
Patented Oct. 25, 1966

3,280,543
HAY WAFERING APPARATUS
Stanley L. Lawrence, Livonia, and Robert E. Cooper, Clarkston, Mich., assignors to Massey-Ferguson Inc., Detroit, Mich., a corporation of Maryland
Filed Dec. 19, 1963, Ser. No. 331,813
7 Claims. (Cl. 56—1)

This invention relates to a method and apparatus for producing hay wafers and, in particular, to a method and apparatus for field wafering forage crops into hay wafers which is particularly characterized by an improved method and means for picking up from the field, preconditioning and feeding hay to be wafered to a wafering apparatus.

In recent times, apparatus have been devised for field wafering forage crops into hay wafers comprising an annular series of axially open die cells including entrance ends thereof circumferentially spaced about and communicating with a wafering chamber in which there is mounted a rotary hay compression means for compressing hay received within the wafering chamber into and through the die cells to form wafers. A rotatable multiple flight feed auger has been disposed within an enclosing hopper having one end thereof communicating with the aforementioned chamber. A pick-up mechanism of the rotary flail type, including a plurality of spaced rapidly rotatable flails or arms, has been provided for picking up and literally throwing hay from a windrow within a field through a delivery chute to the aforementioned hopper for feed therefrom to the wafering chamber. Thus, as such an apparatus moves through a field of mown hay, the latter is continuously picked up and delivered to the aforementioned hopper from which it is fed by the feed auger to the wafering chamber and the rotary hay compression means aforementioned to provide a continuous extrusion of compressed hay emerging from the exit ends of the respective die cells, and each extrusion is adapted to be engaged with suitable ejection means adjacent the exit end of each of the die cells to break the respective extrusions of hay into wafers, which then preferably fall upon a conveyor means for removal from the apparatus.

In an apparatus of the type aforementioned, the hay mixture picked up and delivered by the aforementioned rotary flail pick-up mechanism is entrained in or accompanied by an air stream traveling at considerable velocity due to the action of the rapidly rotating flails or arms thereof. It has been found that, if this air stream or at least a substantial portion thereof is not separated from the hay being delivered to the feed hopper, a back pressure will build up in the latter retarding to a substantial extent further continuous supply of hay thereto by the rotary flail pick-up mechanism. As a consequence, relatively elaborate arrangements have been made heretofore to separate at least part of the air stream from the hay prior to its delivery to the hopper, such as providing means in the delivery chute of the rotary flail pick-up for separating, diverting or venting the air stream or, in other instances, often in combination with the venting arrangement aforementioned, providing various vent openings in a side wall of the hopper alongside the feed auger therein which, of course, is not too satisfactory since hay may be lost therethrough either while delivering hay to the hopper or during the feeding action therefrom under the influence of the feed auger, or both.

Not only does such a rotary flail type pick-up pose the problem of eliminating back pressure from an air stream as aforementioned, but venting of such air stream agitates dust, chaff and the like normally found in the working area of such an apparatus, and resulting literally in a "cloud of dust" surrounding, if not completely enveloping, the apparatus. Furthermore, as such a rotary flail pick-up picks up previously cut and windrowed hay, it also cuts regrowth resulting in a mixture of green and more mature crop which can adversely affect the formation of stable and otherwise satisfactory wafers. In addition, the tendency of such a pick-up is to further chop the cut hay picked up in the windrow to result in relatively non-uniform lengths of material which is ultimately fed to the rotary hay compression mechanism of the hay wafering apparatus which further contributes to improper or unsatisfactory formation of finished wafers.

In view of the foregoing considerations, the present invention contemplates an improved method and apparatus for making compressed hay wafers and of the general type aforementioned in which an annular series of die cells have entrance ends thereof circumferentially spaced about and communicating with a wafering chamber in which there is mounted rotary hay compression means for compressing hay reveived within said chamber into and through said die cells to form wafers, a feed hopper having one end thereof communicating with said chamber and rotatable feed auger means disposed within said feed hopper to feed hay to be wafered therefrom into the chamber, and particularly characterized by a draper type pick-up unit for relatively gently picking up hay to be wafered from a field, means for conveying the picked-up hay to a chopping unit to chop the hay to substantially uniform lengths, and means for feeding the chopped hay from the chopping unit into the aforementioned feed hopper for feed therefrom by the feed auger means to the rotary hay compression means.

More specifically in this regard, the invention is further characterized by the fact that the aforementioned means for conveying picked-up hay to the chopping unit comprises an undershot type elevator which functions to at least partially compress compact or otherwise form the picked-up hay into a blanket or mat for conveyance to the aforementioned chopping unit to facilitate chopping the blanket or mat fed to substantially uniform lengths for ultimate feeding to the hay compression means.

In this regard, the invention is further particularly characterized in that the aforementioined chopping unit is of the reel-type comprising a stationary shear plate extending laterally of the path of travel of the aforementioned blanket or mat of hay being conveyed thereto, and a reel rotatable about an axis parallel to the shear plate and including a plurality of spaced knives successively cooperable with the shear plate to cut the blanket or mat of hay to substantially uniform lengths.

The invention is further characterized by the fact that the aforementioned draper-type pick-up unit is drivingly coupled to supporting wheel means of a mobile frame carrying the instrumentalities of the wafering apparatus in a manner so as to drive the pick up at a speed proportional to the ground speed of the frame.

In order to facilitate an understanding of the invention, a preferred embodiment thereof will now be described with reference to the accompanying drawings in which:

FIGURE 5 is a partially schematic perspective view of the various instrumentalities of the wafering apparatus.

Figure 1:
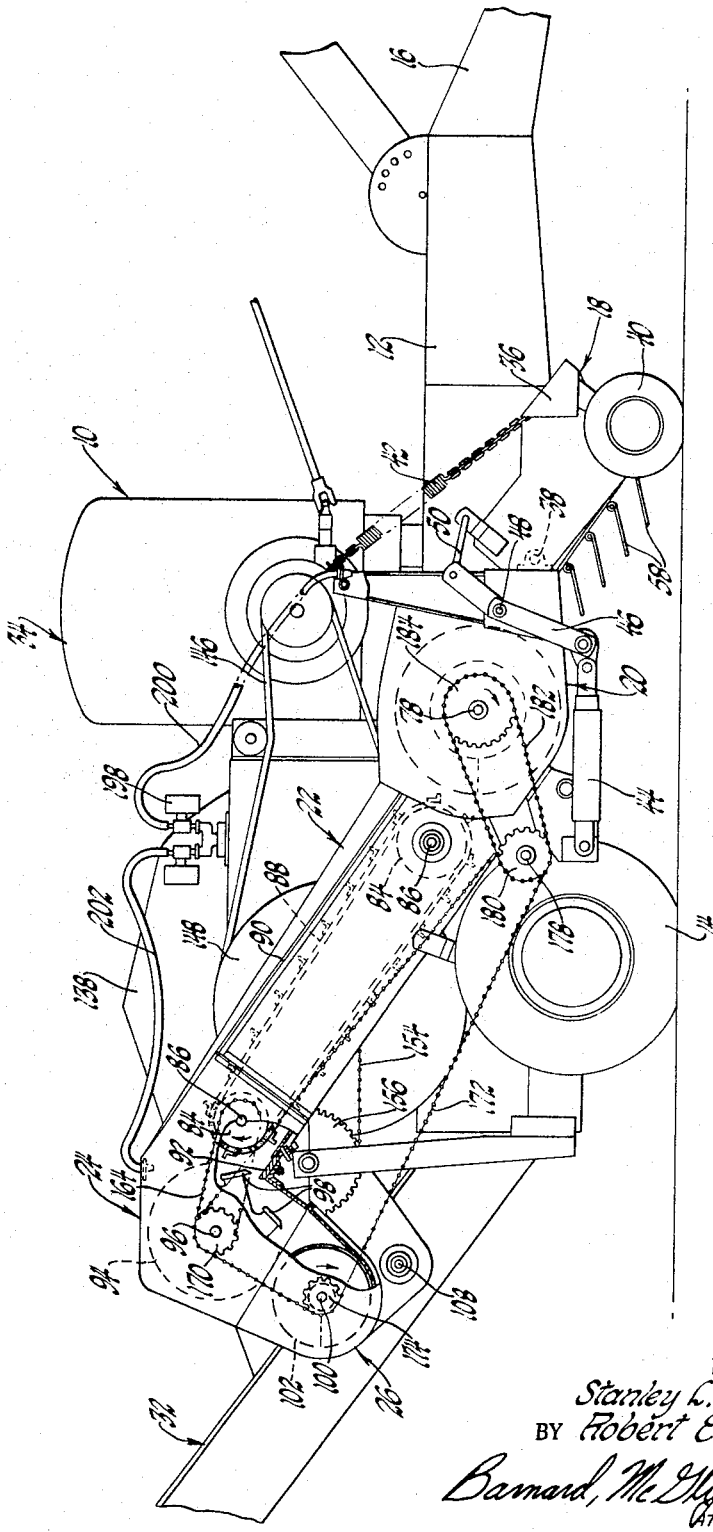
FIGURE 1 is a side elevational view, with parts broken away or shown in phantom to illustrate certain details, of a mobile hay wafering apparatus illustrating a preferred embodiment of the invention.

Referring now to the drawings, and particularly FIG-

URES 2 and 5 thereof, the numeral 10 generally indicates a hay wafering apparatus comprising a frame 12 equipped with ground-engaging wheel means 14 in the usual manner, and a draw-bar 16 adapted to be hitched to a suitable prime mover, such as an agricultural tractor, for drawing the frame along a field of mown hay. Other major components of the wafering apparatus which are suitably mounted or coupled to the frame 12 include, generally speaking, the draper-type pick-up unit 18 adapted to gently pick up and deliver hay to be wafered to a collection auger 20 which collects and discharges the hay to an undershot elevator conveyor 22 for delivery to a reel-type chopping unit 24 where the hay is chopped to uniform lengths and delivered to a cross auger 26 for delivery to the overshot conveyor 28 which discharges the chopped hay through the side of a hopper forming a part of a wafer compressing mechanism 30 which forms wafers and discharges them to the conveyor 32 for conveyance from the frame of the apparatus, preferably into a trailing conveyance, and the engine 34 for powering the various instrumentalities aforementioned all in a manner to be described more specifically hereinafter.

More specifically, the draper-type pick-up unit 18 comprises a hopper-like frame member 36 suitably pivotally mounted to the frame 12 on a horizontal laterally extending axis indicated at 38 in FIGURE 1, while a forward portion of the unit is equipped with the ground-engaging wheels 40. Means including a chain and spring element 42 operatively interconnect a forward portion of the unit 18 to the main frame of the apparatus to yieldably suspend the unit as the latter traverses the ground, at least one hydraulically operated jack 44 being suitably mounted on the main frame of the apparatus and connected through the linkage 46 pivotally connected at 48 to the main frame and through the link 50 to the draper unit to control pivotal movement of the latter about the axis 38 from a ground-engaging pick-up position and a raised transport position.

The draper unit in and of itself is of conventional construction in that it comprises a pair of spaced rolls of drums 52 and 54 suitably rotatably mounted in spaced relation on the unit frame 36 and having entrained thereabout the flexible belting 56 equipped with projecting finger elements 58 which serve, as the belting travels about the drums or rolls, to gently sweep mown hay from a windrow in a field up onto the belting for discharge rearwardly thereof. The draper unit is driven through a drive sprocket 60 suitably coupled to the rearmost drum or roll 54, a drive chain 62 further coupling the sprocket 60 to one sprocket 64 of an idler shaft 66 carrying a further sprocket 68 driven through the chain 70 from the sprocket 72 carried by a shaft rotating with at least one ground-engaging wheel 14 of the main frame of the apparatus. Idler sprockets 74 are provided in engagement with the chain 62 to maintain the latter properly tensioned in engagement with the drive sprocket 60. In this regard, it will be observed that the axis of rotation of the drive sprocket 60 and draper drum or roll 54 is coincident with the axis of rotation 38 of the entire draper unit frame 36 on the main frame of the apparatus. Due to the drive connection aforementioned, it will now be apparent that the draper unit will be driven at a speed directly proportional to the ground speed of the frame 12.

The collection auger 20, including the opposed auger flights 76, is suitably mounted on shaft 78 suitably rotatably mounted on the main frame 12 of the apparatus so as to extend laterally thereof rearwardly behind the draper unit 18, the collection auger being power driven in a manner to be described hereinafter. Thus, as hay is swept up by the draper unit 18 and delivered throughout the length of the collection auger 20, the opposed flights of the latter will direct such hay to an area thereof provided with conventional retracting finger elements 80 for discharging the hay into the lower end of the undershot conveyor 22.

The undershot conveyor 22 extends rearwardly and upwardly from the collection auger 20 and includes the longitudinally spaced drums or rolls 84 suitably rotatably mounted on the main frame 12 on the rotatable shafts 86, and having entrained thereabouts a conventional flexible conveyor belt 88 the lower reach of which is spaced a suitable distance from an opposed wall of an enclosing housing 90 of the conveyor as is common practice with such conveyors. The undershot conveyor 22 is also power driven in a manner to be described more fully hereinafter. At this juncture, it may be noted that the hay delivered to the undershot conveyor is at least partially compressed or compacted between the lower reach of the conveyor belt 86 and the opposed wall of the housing 90 to form a blanket or mat of hay which is conveyed to the upper end of the conveyor and into the reel-type chopping unit 24.

The reel-type chopping unit 24 comprises a shear bar or plate 92 extending laterally of the path of travel of the aforementioned blanket or mat of hay and is disposed at the upper end of the elevator housing 90 opposite the lower reach of the belt 88 as best shown in FIGURE 1. A chopper reel 94 is mounted on a shaft 96 suitably rotatably mounted on the frame 12 of the apparatus and extending parallel to the shear bar or plate, and includes the spaced knives 98 likewise extending parallel to the shear bar or plate 92 and being successively cooperable therewith to cut the blanket or mat of hay emerging from the upper end of the elevator 22 to substantially uniform lengths which then drop into one end of the cross auger 26. The reel-type chopper is also power driven in a manner to be described hereinafter.

The cross auger 26 includes the drive shaft 100 suitably rotatably mounted on the main frame of the apparatus and supporting the auger flight 102, the cross auger extending laterally of the main frame of the apparatus so as to convey chopped material from the chopping unit 24 laterally toward and above the lower end of the overshot conveyor 28 where paddles 104 project hay onto the latter. Again, the cross auger 26 is power driven as will be described hereinafter.

Thus, chopped hay is transferred by the cross auger 26 to the lower end of the overshot conveyor 28 comprising the longitudinally spaced drums or rolls 106 mounted on the shafts 108 suitably rotatably mounted on the main frame of the apparatus and entraining the flexible conveyor belt 110, the shaft of the lowermost drum being power driven in a manner to be described hereinafter.

Chopped hay delivered to the overshot conveyor 28 is conveyed by the latter to the hay compression mechanism 30 comprising a feed hopper 112 enclosing a suitably rotatably mounted drive shaft 114 extending therethrough and mounting for rotation therewith the feed auger 116. Hay is delivered from the elevator 28 through the top side wall of the hopper 112 intermediate the ends of the feed auger disposed therein and is fed by the latter toward one end of the hopper and into an annular wafering chamber 118. Radially extending arm members 120 are suitably rigidly secured to one end of the drive shaft 114 for rotation therewith within the wafering chamber 118, and rotatably mount the compression rollers 122 at the opposite ends thereof. The feed auger 116 operates to feed hay into the wafering chamber 118 in advance of the path of rotation of the arm members 120 and the respective rollers 122 for a purpose to appear hereinafter.

The wafering chamber 118, die cells associated therewith and through which the hay is adapted to be compressed by the rollers 122 to form extrusions of compacted hay emerging from the exit ends thereof, and the means for breaking wafers from such extrusions and conveying them from the apparatus may be constructed in any one of various known ways, one of which is illustrated in the drawings. Since the details of such construction do not, in and of themselves, form any part of the present invention and are known, a brief description of the nature and operation of these components of the apparatus should suffice for present purposes.

Figure 4:
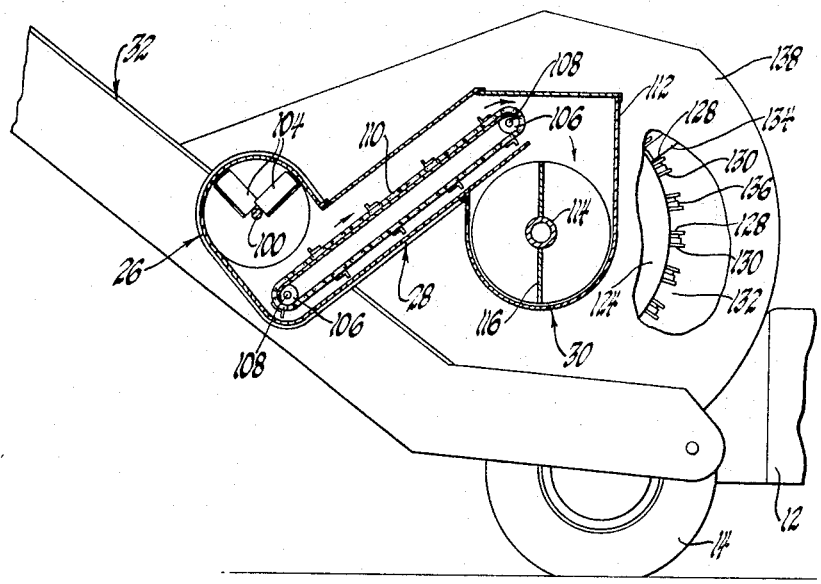
FIGURE 4 is a view, partially in section and broken away to illustrate certain details, taken on line 4—4 of FIGURE 2.

Thus, the wafering chamber 118 includes a pair of spaced vertically disposed parallel annular end die wall members 124 suitably mounted in a fixed relationship, and there being fixedly disposed therebetween an annular or circumferential series of knife edges 126. An annular or circumferentially spaced series of pairs of side die wall members 128 and 130 are disposed between the end die wall members 124, and have their radially inner ends suitably hingedly connected adjacent a radially outward portion of each of the respective fixed knife edges 126 so as to diverge radially outwardly therefrom in a V-shaped configuration. Thus, a series of axially open radially extending die cells 132 are formed between the end die wall members 124 and the respective oppositely spaced side die wall members 128 and 130 of an adjacent pair thereof as will be readily apparent to those acquainted with this art, and the axes of such die cells are contained in a common vertical plane or plane vertical with the ground, with the entrance ends thereof communicating with the wafering chamber 118. An annular series of ejector plates 134, one for each die cell, is suitably secured adjacent each die cell and associated therewith so as to extend obliquely of the axes and over the exit ends thereof for engagement with extrusions of compacted hay emerging from the die cells to break the extrusions into wafers. Only one of such ejector plates is shown in FIGURES 4 and 5 in the interest of clarity.

The numeral 136 indicates conventional hydraulically operated motor assemblies of the type comprising relatively reciprocable piston and cylinder elements interposed between each hinged pair of side die wall members 128 and 130 to control their angular relationship relative to each other and, hence, the extent of convergence of the areas of the die cells between their entrance and exit ends, each of the motor assemblies being connected in the usual manner to a common manifold in turn connected to a suitable source of fluid under pressure carried by and manually controlled from the frame 12.

A housing 138 surrounds the wafering chamber 118 and associated die cells 132 aforementioned so as to direct wafers ejected and broken by the ejector plates 134 downwardly by gravity onto the lower end of the elevator conveyor 32. Such conveyor includes the usual spaced rollers or drums, the drive roller or drum 140 being shown as mounted on the shaft 142 with the elevator belt 144 entrained thereabout to convey finished wafers from the frame preferably into a trailing conveyance. The elevator conveyor 32 is power driven in the manner of the other instrumentalities aforementioned as will now be described.

The engine 34 is mounted on the frame 12 so as to extend transversely thereof forwardly of the hay compression apparatus 30, and includes an output shaft mounting a pulley means entraining the belt 146 to drive the various instrumentalities of the apparatus aforementioned. More specifically, the belt 146 is entrained about the large pulley or flywheel 148 secured to the drive shaft 114 for rotatably driving the auger 116 and compaction rollers 122 to force hay into and through the die cells to form extrusions of hay and, ultimately, finished hay wafers. As will be apparent, rotary drive is also conducted from the drive shaft 114 to the shaft 142 driving the elevator conveyor 32 by means of a belt 150 entrained about pulleys respectively secured to the shafts 114 and 142.

A drive sprocket 152 also carried by the drive shaft 114 adjacent the flywheel 148 entrains a drive chain 154 extending about a sprocket 156 secured to shaft 158 suitably rotatably mounted on the frame of the apparatus and mounting the gear 160. Gear 160 meshes with chopper unit drive gear 162 secured to the drive shaft 96 of the chopper unit to rotatably drive the latter.

Drive is transmitted from the drive shaft 96 of the chopper unit to the upper drive roll or drum 84 of the undershot elevator conveyor 22 by means of the drive chain 164 entrained about sprocket 166 on chopper drive shaft 96 and sprocket 168 on drum shaft 86. Another sprocket 170 is secured to the chopper unit drive shaft 96 and entrains the drive chain 172 which also drivingly meshes with a sprocket 174 carried by the cross auger drive shaft 100 and a sprocket 176 carried on a suitably rotatably mounted idler shaft 178 having another spaced sprocket 180 connected through drive chain 182 to a sprocket 184 carried by the drive shaft 78 of the collection auger 20. Thus, as the chopper unit drive shaft 96 is rotated, drive is further conducted simultaneously to the collection auger 20, undershot elevator conveyor 22 and cross auger 26.

Drive is further conducted from the cross auger 26 to the overshot elevator conveyor 28 by means of the drive chain 186 entrained about the respective sprockets carried by the auger shaft 100 and the lower roller or drum shaft 108 of the conveyor.

Figure 2:
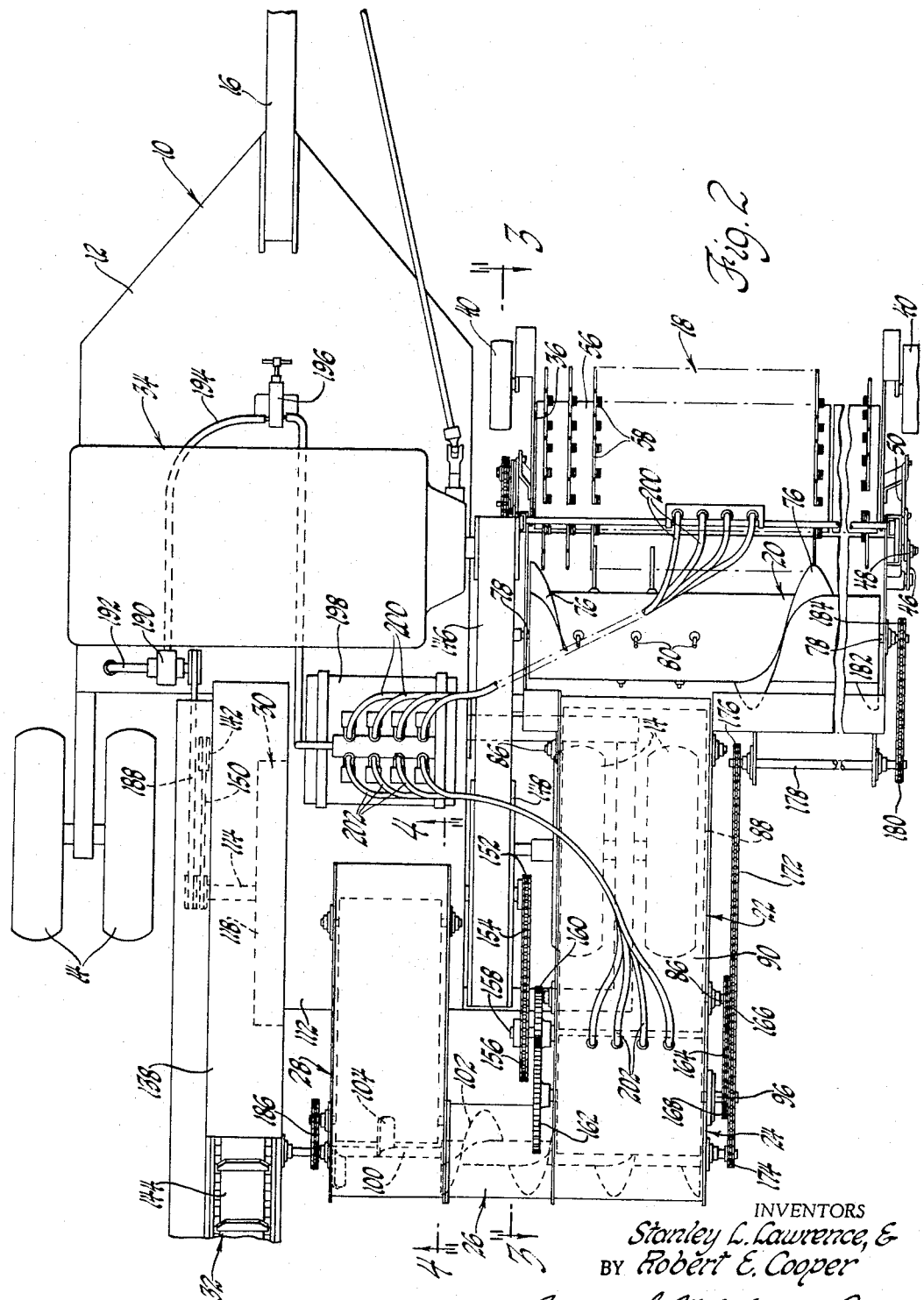
FIGURE 2 is a top plan view of the hay wafering apparatus of FIGURE 1.
Figure 3:
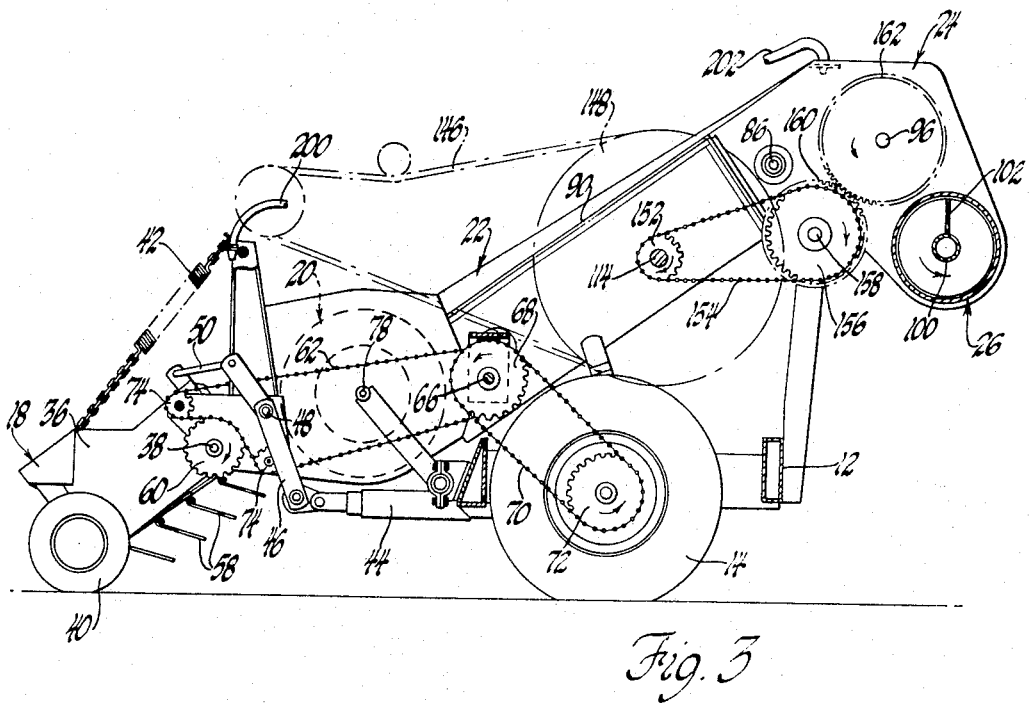
FIGURE 3 is a view, partially in section and in phantom to illustrate certain details, taken on line 3—3 of FIGURE 2.

With reference particularly to FIGURE 2, rotative drive is further transmitted from the drive shaft 114 of the hay compression apparatus 30 through a pulley and belt 188 entrained thereabout to a drive pulley associated with a pump 190 connected through a conduit 192 to a source of water, not shown, to deliver water moisture through the conduit 194 including control valve 196 to a manifold 198 from which the groups of conduits 200 and 202 respectively supply such water moisture to hay to be wafered at two locations; that is, to the hay being picked up from a windrow by the draper pick-up 18 and just prior to delivery of such hay to the collection auger 20, and also to the blanket or mat of hay being discharged from the undershot conveyor 22 to the reel-type chopper 24. The supply of water is so regulated by valve 196 in accordance with field conditions encountered at any given time to insure optimum moisture content for the purpose of ultimately forming stable self-sustaining wafers.

At this juncture, particular note should be made of the relative disposition of the various instrumentalities of the apparatus aforedescribed relative to the frame 12 to provide as compact a structure, both laterally and longitudinally, as possible to facilitate maneuverability of the entire apparatus while minimizing parking space required therefor. More specifically, it will be noted that the draper pick-up 18, collection auger 20, undershot elevator 22 and chopping unit 24 are arranged generally serially front to rear along one side of the main frame 12 for the purpose of gently sweeping or picking up hay to be wafered and delivering same in chopped form to one end of the cross auger 26. The cross auger then conveys such chopped hay laterally of the main frame 12 along a rearward portion of the latter for discharge into the overshot conveyor 28 which, in turn, conveys the chopped hay forwardly of the main frame for discharging into the side wall of the hopper 112 communicating with the wafering chamber 118 of the hay compression apparatus indicated generally at 30 and extending laterally of the main frame. Hay so delivered is wafered in the die cells 132 and discharged into the elevator conveyor 32 extending generally alongside the elevator 28 for discharge rearwardly from the frame. At the same time, the axis of the engine 34 is disposed generally laterally of the main frame 12 forward of the compression means 30 and alongside the draper unit 18 and collection auger 20. As a result of the aforedescribed relative disposition of the various instrumentalities of the apparatus, and particularly the fact that the hay is serially conducted from the field preferably to a trailing conveyance at the discharge end of the elevator 32 by alternately flowing the hay, first, rearwardly along one side of the apparatus, then laterally and forwardly thereof to the compression apparatus 30, and then rearwardly of the apparatus again, results in a relatively compact apparatus insofar as its lateral and longitudinal dimensions are concerned.

A brief summary of the operation of the aforedescribed apparatus should now suffice in view of the foregoing description. Thus, as the apparatus mounted on the mobile frame 12 is towed along a field of mown hay, preferably arranged in windrows, the draper pick-up 18 will gently sweep and pick up such hay and deliver it rearwardly to the laterally extending collection auger 20 which will collect such hay and deliver it to the undershot conveyor 22. Hay so delivered to such conveyor is conveyed upwardly thereof and rearwardly of the main frame 12 and, during such conveying action, the hay is compressed to a certain degree to form a blanket or mat which is delivered across the shear bar or plate 92 of the reel-type chopper 24 so as to be chopped into substantially uniform lengths by the blades or knives 98 of the latter. The chopped hay then drops into one end of the cross auger 26 which delivers such hay to the lower end of the conveyor 28. Hay so delivered is then deposited through the side wall of the hopper 112 into the latter for feed by the feed auger 116 to the wafering chamber 118. The rollers 122 are positioned closely to but do not engage the knife edges 126 and, as a result, hay fed continuously by the feed auger 116 into the wafer chamber 118 is laid across the knife edges 126 and upon the entrance ends of the respective die cells 132 immediately in advance of the rotative path of the rollers, which rollers then compact or compress the hay and force it past the knife edges and into and through the respective die cells upon successive rotative passes of the rollers.

As extrusions of compressed hay emerge from the exit ends of the respective die cells, such extrusions engage the respective ejector plates 134 which cause such extrusions to bend and break substantially at the exit ends of the die cells to form wafers of substantially uniform length which drop within and toward the bottom of the housing 138 onto the lower end of the conveyor 32 which picks up the wafers and conveys them from the apparatus, preferably into a trailing conveyance.

Naturally, as hay is picked up from the windrow in a field and formed into finished wafers, a suitable amount of moisture is applied from the manifold 198 through the conduits 200 and 202 to the two spaced locations aforedescribed and for the purposes aforementioned. Valve 196 may be manipulated to selectively control flow of such moisture to the hay.

In view of the foregoing description, it will now be apparent that the aforedescribed construction completely eliminates problems heretofore presented by rotary flail-type pick-ups which literally throw hay from a windrow into the hay compression apparatus, and posing the problem of venting or otherwise eliminating air in which the hay particles are entrained for the further purpose of preventing build-up of a deleterious back pressure tending to counteract further delivery of hay to be wafered. Thus, the draper pick-up 18 gently sweeps or picks up and conveys the hay, rather than throwing it, and without the generation of any such air stream whatsoever. Since such an accompanying air stream is eliminated, there is no requirement for utilizing the venting systems of the prior art and the dust problem heretofore occasioned by venting of such an air stream is eliminated. In addition, the draper pick-up does not cut any regrowth which may have occurred since mowing or cutting of the hay to be wafered, and therefore further eliminates the problem of mixing green crop with a cured crop to be wafered. Furthermore, the gentle pick-up action coupled with the delivery of the hay in a blanket or mat form to the reel-type chopper results in cutting of the hay to be wafered to more uniform lengths than is possible with apparatus in which a rotary flail-type pick-up delivers hay directly to a wafering apparatus.

The embodiments of the invention in which an exclusive property or privilege is claimed are defined as follows:

1. In an apparatus for making compressed hay wafers, and of the type having an annular series of die cells including entrance ends thereof circumferentially spaced about and communicating with a wafering chamber in which there is mounted rotary hay compaction means for compacting hay received within said chamber into and through said die cells to form wafers, a feed hopper having one end thereof communicating with said chamber, and rotatable feed auger means disposed within said feed hopper to feed hay to be wafered therefrom into said chamber; the improvement comprising a pick-up unit for gently picking up hay to be wafered from a field, means for forming picked-up hay into a mat while simultaneously conveying the latter to a reel-type chopping unit, said chopping unit being operable to cut the mat of hay conveyed thereto to substantially uniform lengths, means for feeding chopped hay from said chopping unit through the side of said feed hopper for feed therefrom by said feed auger means, and means for simultaneously adding moisture to hay being picked up by said pick-up unit and the mat of hay being chopped by said chopping unit.

2. In an apparatus for making compressed hay wafers, and of the type comprising a mobile frame having ground-engaging wheel means and adapted to be towed through a field of cut hay, an annular series of die cells including entrance ends thereof circumferentially spaced about and communicating with a wafering chamber in which there is mounted a rotary hay compaction means for compacting hay received within said chamber into and through said die cells to form wafers, a feed hopper having one end thereof communicating with said chamber, and feed auger means disposed within said hopper for feeding hay therefrom to said chamber; the improvement comprising a pick-up unit mounted on and extending laterally of a forward portion of said frame for picking up hay from the field, collecting auger means mounted on said frame and extending laterally behind said pick-up unit to receive and collect hay therefrom, an undershot elevator conveyor mounted on said frame and extending rearwardly from said collection auger means to receive and form hay from the latter into a mat and convey the latter rearwardly of said frame, a reel-type chopping unit mounted on said frame and receiving the mat of hay conveyed by said undershot conveyor and being operable to cut the mat of hay to substantially uniform lengths, cross auger means mounted on said frame and extending laterally behind said chopping unit to receive and convey chopped hay laterally away therefrom, an overshot elevator conveyor mounted on said frame and extending forwardly and upwardly from beneath said cross auger means to receive chopped hay from the latter and convey it to said feed hopper, and discharge conveyor means mounted on said frame and extending rearwardly thereof from beneath said wafering chamber to collect hay wafers therefrom and discharge said wafers from said frame.

3. The apparatus according to claim 2 wherein said chopping unit comprises a stationary shear plate extending laterally of the path of travel of the mat of hay discharged from said undershot conveyor, and a reel rotatable about an axis parallel to said shear plate and including a plurality of spaced knives successively cooperable with the latter to cut the mat of hay to substantially uniform lengths.

4. The apparatus according to claim 2 wherein said overshot conveyor delivers hay through the side of said feed hopper intermediate the ends of said feed auger means therein.

5. The apparatus according to claim 2 further comprising means interconnecting said wheel means of said frame to said pick-up unit to drive the latter at a speed proportional to the ground speed of said frame.

6. The apparatus according to claim 2 further comprising means for simultaneously adding moisture to hay being picked up by said pick-up unit and the mat of hay being chopped by said chopping unit.

7. In an apparatus for making compressed hay wafers, and of the type comprising a mobile frame having ground-engaging wheel means and adapted to be towed through a field of cut hay, an annulur series of die cells including entrance ends thereof circumferentially spaced about and communicating with a wafering chamber in which there is mounted a rotary hay compaction means for compacting hay received within said chamber into and through said die cells to form wafers, a feed hopper having one end thereof communicating with said chamber, and feed auger means disposed within said hopper for feeding hay therefrom to said chamber; the improvement comprising a draper pick-up unit mounted on said frame so as to extend laterally of a forward portion thereof and including a moving belt having fingers for gently picking up hay from the field, drive means connecting said wheel means to said pick-up unit to drive the belt of the latter at a speed proportional to the ground speed of said frame, collection auger means mounted on said frame and extending laterally behind said pick-up unit to receive and collect hay therefrom, an undershot elevator conveyor mounted on said frame and extending rearwardly from said collection auger means to receive and form hay from the latter into a mat and convey the latter rearwardly of said frame, a reel-type chopping unit mounted on said frame and receiving the mat of hay conveyed by said undershot conveyor, said chopping unit comprising a stationary shear plate extending laterally of the path of travel of the mat of hay discharged from said conveyor, a reel rotatable about an axis parallel to said shear plate and including a plurality of spaced knives successively cooperable with the latter to cut the mat of hay to substantially uniform lengths, cross auger means mounted on said frame and extending laterally behind said chopping unit to receive and convey chopped hay laterally away therefrom, an overshot elevator conveyor mounted on said frame and extending forwardly and upwardly from beneath said cross auger means to receive chopped hay from the latter and convey it above said feed hopper for discharge through the side of the latter, discharge conveyor means mounted on said frame and extending rearwardly thereof from beneath said wafering chamber to collect wafers therefrom and discharge said wafers from said frame, and means for simultaneously adding moisture to hay being picked up by said pick-up unit and the mat of hay being chopped by said chopping unit.

References Cited by the Examiner
UNITED STATES PATENTS

| | | | |
|---|---|---|---|
| 2,716,317 | 7/1955 | McClellan | 56—1 |
| 2,732,674 | 1/1956 | Thwaites | 56—1 X |
| 2,839,885 | 6/1958 | Eischens | 56—364 |
| 3,009,413 | 11/1961 | Alexander et al. | 100—218 |
| 3,038,419 | 6/1962 | Klemm et al. | 107—8 |
| 3,082,588 | 3/1963 | Jay et al. | 56—1 |
| 3,153,889 | 10/1964 | Peterson | 56—1 |
| 3,158,975 | 12/1964 | Peterson et al. | 56—1 |

ABRAHAM G. STONE, *Primary Examiner.*

ANTONIO F. GUIDA, *Examiner.*